United States Patent [19]

Lambing et al.

[11] Patent Number: 5,225,025
[45] Date of Patent: Jul. 6, 1993

[54] APPARATUS AND METHOD FOR RESISTANCE WELDING

[75] Inventors: Cynthia L. T. Lambing, Alcoa Center, Pa.; Stephen M. Andersen, Bear, Del.; Scott Holmes, Holland, Pa.; Roderic Don, Newark, Del.; Scott Leach, Baltimore, Md.; John Gillespie, Hockessin, Del.

[73] Assignee: Aluminum Company of America, Pittsburgh, Pa.

[21] Appl. No.: 699,378

[22] Filed: May 14, 1991

[51] Int. Cl.$^5$ .................. B32B 31/00; B32B 31/24
[52] U.S. Cl. .................. 156/358; 156/359; 156/378; 156/379; 156/379.6; 156/379.7; 156/498; 156/499; 156/502; 156/556; 156/581; 156/583.1
[58] Field of Search ........... 156/358, 359, 378, 379, 156/379.6, 379.7, 379.8, 498, 499, 502, 556, 580, 581, 583.1

[56] References Cited

U.S. PATENT DOCUMENTS

| | | | |
|---|---|---|---|
| 2,633,443 | 7/1949 | Langer | 154/126 |
| 2,667,437 | 1/1984 | Zoubek | 154/126.5 |
| 4,029,837 | 6/1977 | Leatherman | 428/247 |
| 4,054,473 | 10/1977 | Ohnstad | 156/71 |
| 4,257,840 | 3/1981 | Fujii | 156/556 |
| 4,313,777 | 2/1982 | Buckley et al. | 156/272 |
| 4,494,408 | 1/1985 | Delacy | 73/587 |
| 4,571,921 | 2/1986 | Wolfson | 53/373 |
| 4,618,168 | 10/1986 | Thalmann et al. | 285/21 |
| 4,631,107 | 12/1986 | Ramsey | 156/359 |
| 4,640,732 | 2/1987 | Stafford | 156/358 |
| 4,673,450 | 6/1987 | Burke | 156/153 |
| 4,676,851 | 6/1987 | Scheibner et al. | 156/66 |
| 4,749,833 | 6/1988 | Novorsky et al. | 219/10.43 |
| 4,871,412 | 10/1989 | Felix et al. | 156/273.9 |
| 4,950,347 | 8/1990 | Futagawa | 156/272.4 |
| 5,037,498 | 8/1991 | Umeda | 156/307.3 |

OTHER PUBLICATIONS

H465 (May 13, 1988) U.S. Statutory Invention Registration (Brown).

Primary Examiner—David A. Simmons
Assistant Examiner—J. Sells
Attorney, Agent, or Firm—Arnold B. Silverman; Gary P. Topolosky

[57] ABSTRACT

A method and apparatus for automated resistance welding of materials is provided. The material may be thermoplastic material. The material has a layer of a second material adjacent thereto. The second material is a dissimilar material which may be applied as a film or a coating on the first material, or the second material may be a separate layer placed adjacent the first material. A heating element is placed in the interface between overlapping portions of the two pieces of material to be welded together. The layers are directly adjacent to the heating element. The layers can be consolidated onto the heating element if desired. The heating element can be composed of carbon fibers in a polymer matrix. The heating element is supplied with current to generate resistive heating. The heating causes melting of the layers adjacent to and contacting the material. Pressure is applied to the area being welded to fuse the materials together. A lower pressure may be applied as a clamping force to areas adjacent to the welded area. The welding may be performed in a step wise fashion to separate weld segments or substantially completely to the entire weld joint. A cooling mechanism is also provided. The weld is simultaneously inspected for the occurrence of melting and for bond quality. A control system is provided for full automation of the system.

24 Claims, 5 Drawing Sheets

APPARATUS AND METHOD FOR RESISTANCE WELDING

BACKGROUND OF THE INVENTION

1. Field of the Invention

This invention relates generally to welding apparatus and methods. In particular, the invention relates to resistance welding preferably of thermoplastic materials.

2. Background Information and Description of the Prior Art

Joining of materials is a critical step in the manufacture of composite products. The recent increase in use of thermoplastic matrix composites, for example in aircraft component parts such as floor panels, stiffeners and skins, presents particular problems with respect to joining of such products. Conventional joining techniques typically involve the use of adhesives or mechanical fasteners. Depending upon the application in which the thermoplastic matrix is to be used, adhesives are often not desirable or acceptable due to unsatisfactory peel properties. Mechanical fasteners can also be undesirable due to the likelihood of cut fibers and stress concentrations. As a result, the concept of fusion bonding or resistance welding has been considered.

In resistance welding, thermal energy is supplied directly to the bond interface between the two pieces of material to be bonded by passing an electric current through a heating element. The heating element is placed between the two pieces of material to be bonded together. The heating element is preferably composed of a unidirectional continuous carbon fiber in a matrix which may be either identical to or different from that of the parts being joined. The joint is heated above the melt temperature or glass transition temperature of the matrix while a consolidation pressure is applied. When uniform melting of the interface is achieved, the current is turned off and the parts are allowed to cool under pressure to assure good bonding. The carbon fibers will be fused directly into the welded sheets of material and are not removed after the welding process.

A problem which has arisen with respect to resistance welding of thermoplastic materials is overheating of the part edges where the heating element enters the lap joint. This causes possible melt through to the part surfaces before welding is completed. This overheating is attributed to the change in the heat transfer mechanism of the heating element from being primarily conductive heat transfer occurring within the weld region to being primarily convective heat transfer occurring in free air. The exposed portion of the heating element is significantly hotter causing localized overheating. This uneven heating results in incomplete welding and poor properties of the welded material.

Another significant problem which has arisen occurs in uneven heating across the length of the heating element. This may be due to inherent small differences in the conductivity of the individual fibers which make up the current path. Alternatively, variations in fiber content or in thickness of the fiber member can cause uneven heating. In addition, a difficulty in achieving identical electrical contact with each of the fibers may also be an explanation for uneven heating. The severity of uneven heating grows with increasing width of the heating element. For example, if a weld joint is large in lateral dimension, a similarly long heating element is used. This gives rise to the problems of uneven heating.

Yet another problem is known as "current leaking" wherein a portion of the welding current is conducted through the laminates being joined rather than solely through the heating element thereby causing a significant loss of heating. This occurs when there is direct electrical contact between (a) the carbon fibers and the heating element; and (b) the fibers of the laminates.

Conventional methods of performing resistance welding include use of an Instron 1125 test machine which is manufactured by Instron Corporation or Cortun, Mass. Also included is a 110 V AC Variac and an inductive ammeter. This equipment utilized a constant displacement process that results in uncontrollable squeeze flow, i.e. fiber movement, that causes significant variation in depth. However, this apparatus does not provide easy control over the consolidation pressure applied to the bond.

U S. Pat. No. 4,871,412 discloses a method of bonding a thermoplastic material to a substrate. The thermoplastic layer comprises carbon fibers coated with polyetheretherketone (referred to herein as "PEEK"). Rollers are used to apply pressure to the layer while current is induced in the layer to weld the layer to the substrate.

U.S Pat. No. 4,054,473 discloses a method for welding a separate strip in overlapping relationship to sections of plastic liners in pipes in order to connect the plastic liner sections. A pair of heater elements serve as electrical conductors. The heater elements have cores which are fused under heated pressure to one side of a welding strip of thermoplastic material. The heater elements are positioned along margins of the strip in spaced and parallel relationship. Current is passed through the heating elements for a period of time sufficient to produce heating and fusing of the heater element core to the pipe liners. This acts to join the plastic liners in the pipes.

A method of spot welding using PEEK and graphite fibers was disclosed in U.S. Pat. No. 4,673,450.

Methods of cooling electrical leads have been known such as that disclosed in U.S. Pat. No. 4,029,837 in the context of magnetic induction coils. U.S. Pat. No. 2,667,437 discloses a coolant which is pumped through openings in electrodes to cool electrodes.

Various methods of using ultrasonic detectors have been known. For example U.S. Pat. No. 4,494,408 discloses a method and apparatus for monitoring and controlling potential residual stress relief mechanisms in composite epoxy resin materials. Ultrasonic energy impinged upon the materials produce signatures identifiable with known residual stress relief mechanisms. U.S. statutory invention registration H465 discloses an ultrasonic method for monitoring resin cure during composite sheet material fabrication.

U.S. Pat. No. 4,950,347 discloses a method of welding thermoplastic resin with a high frequency welder. Higher frequency waves are applied through electrodes to weld the thermoplastic resin. The disclosure is particularly relevant to preparing bags for blood supplies.

There remains a need for an apparatus and method to automate the resistance welding of large lap joints or butt joints in thermoplastic composite panels. There remains a further need to reduce the problems associated with uneven heating across the width of the weld area and overheating of the part edges. There is also need for a nonintrusive method for inspecting and detecting melting at the interface of the weld without resorting to direct temperature methods by way of implanted thermocouples. Furthermore, computer control results in highly repeatable, high quality welds with reduced standard deviation.

SUMMARY OF THE INVENTION

These and other needs have been met by the present invention which provides an automated apparatus and a method for resistance welding of large joints in thermoplastic composite panels The resistance welding system is preferably used for joining at least two pieces of thermoplastic composite material which are composed of a substrate of thermoplastic material which is provided with a dissimilar resin layer which may be either a film or a coating on the underlying thermoplastic material. Alternatively, the resin layer may be a separate layer in the system or it may be consolidated onto the heating element. The layer preferably has a lower glass transition or melting point than that of the substrate. However, it is also possible to bond two panels of thermoplastic composite material together directly in accordance with the present invention. This is particularly true with composites containing PEEK, a high performance thermoplastic material.

The device and method of the present invention involve placing a heating element in the interface between the two pieces of material which are to be lap welded. Although a single heating element is referred to throughout the disclosure, it is preferred to provide a series of individual heating element portions which correspond to a particular segment being welded and which can be individually energized. The heating element is placed along the overlapping portion to be welded. Preferably, the heating element is composed of unidirectional carbon fibers. Most preferably, the heating element is composed of unidirectional carbon fibers in a matrix material, either a polymer or resin, which is compatible with the parts to be joined. The carbon-fiber heating element is connected to a power supply which passes current through the element. As this current passes through the fibers, joule or resistance heating occurs which begins to soften and melt the film at the interface of materials.

The system of the present invention includes a pressure application subassembly that applies pressure selectively to the weld region. Preferably, high pressure is applied at the center of the weld region while the heat is being applied to fuse the pieces together. The high pressure force can be varied throughout the welding process to control the degree of squeeze flow of the melted polymer at the interface. The carbon fibers remain within the weld joint and are not removed when the weld process is completed.

Instead of welding the entire joint at once, the present invention may employ a system which welds individual segments of the joint one at a time. However, the invention is not limited to welding only in steps. If sequential welding is performed, the material is then re-positioned with each cycle to weld sequential segments until the weld is completed as desired. In order to accomplish this, a carriage system is provided for automated sequential welding. For example step wise welding in sections of about 2 inches along the weld direction is preferable. This would mean twelve welding cycles to fully weld a 24-inch joint, for example. It may also be preferable to weld smaller segments such as ½-inch weld segments within the two-inch segments. More specifically, by breaking a weld segment down into four smaller ½ inch segments, the power can be cycled in a rapid succession through these smaller segments to promote more uniform heating and maintain a constant power level within the larger two-inch strip. This small-scale cycling is accomplished with four solid state relays that can be controlled independently to deliver power to each of the four smaller segments.

It is preferable that the film members achieve melt conditions to assure that adequate pressure is applied during the process in order to obtain a weld of suitable quality. It is undesirable to have the underlying substrate begin to melt. The present invention provides ultrasonic detection for melt and bond quality which can be used without the necessity of temperature measurements conventionally used.

As noted hereinbefore, high pressure is applied at the area of the segment being welded in order to fuse the parts together. In addition, lower pressures are applied adjacent to the weld area to provide a clamping action.

A cooling system is also provided to minimize localized heating. The cooling system preferably comprises an inert gas such as nitrogen which is passed across the the exposed heating element ends.

It is an object of the invention to provide an automated resistance welding system which can be used with relatively large pieces of material to be joined.

It is another object of the invention to provide an apparatus and method which will effectively and economically provide resistance welding while reducing the previously known problems of uneven heating across the entire joint, overheating of the part edges, current leaking and resulting variation of joint strength.

It is another object of the invention to provide an apparatus and method which allows for monitoring and controlling of the pressure application during the weld step.

It is another object of the invention to provide a step wise or substantially entirely automated welding system which can be computer controlled.

It is yet another object of the invention to provide a method and apparatus for resistance welding which allows for simultaneous ultrasonic detection of melting at the interface and bond qualities.

It is a further object of the invention to provide a device which incorporates computer control for weld consolidation, pressure and electrical heating power.

These and other objects of the invention will be more fully understood from the following description of the invention with reference to the illustrations appended hereto.

DESCRIPTION OF THE PREFERRED EMBODIMENTS

Although not limiting of the invention, the disclosure herein describes the welding apparatus and process in the context of welding two pieces of thermoplastic material. Typical thermoplastic materials with which the invention can be used are, for example, PEEK (Polyetheretherketone) and PIE (polyetherimide), HTA, K-III (avimide K), Radat (polyethersulfone) and PAS-II (polyacrylene sulfide). This thermoplastic material will be referred to herein as either the "composite part" or the "substrate". Preferably, in addition to the substrate a layer of neat resin film is provided which is a polymer film without reinforcement. This layer may be consolidated on top of the substrate. Alternatively, the film layers may be placed as two separate elements in the stack of materials to be welded. Yet another alternative is to consolidate the film layer on the heating element as described hereinafter. Any of these alternatives may be used, however, for convenience of disclosure, the substrate is described as having the layer consolidated directly onto the substrate. Examples of the consolidating film are PEEK (polyetheretherketone), PIE (polyetherimide), HTA, K-III (avimide K), Radat (polyethersulfone) and PAS-II (polyacrylene sulfide). These example materials are the same as those stated above, however, any layer of polymer film which has a melting temperature or glass transition temperature as the case may be, and as would be readily understood by those skilled in the art, which temperature is lower than or equal to that of the underlying substrate may be used in accordance with the present invention. By way of example, the substrate is preferably between about 0.039 and 0.195 inches thick although it is not limited to this range. The film layer preferably has a thickness of between about 0.005 and 0.010 inches.

Figure 1A:
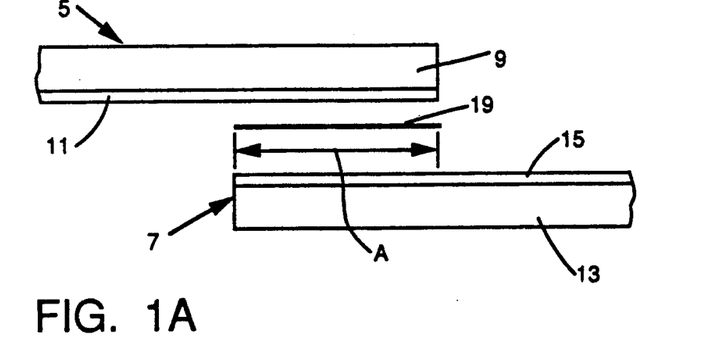
FIG. 1A is a schematic front elevation of two pieces of material to be joined in an overlapping weld joint in accordance with the method of the present invention.

This will be more specifically understood with reference to FIG. 1A. For convenience of disclosure, FIG. 1A shows a first piece 5 of material which is to be overlapping and welded to a second piece 7 of material. However, as discussed hereinbefore this is not the only configuration with which the invention may be used. Material 5 is composed of thermoplastic composite substrate 9 and resin film layer 11. Similarly, material 7 is composed of composite thermoplastic substrate 13 consolidated with film 15.

Pieces 5 and 7 are to be bonded together in a lap joint as shown by the arrow designated as Zone A in FIG. 1A. As mentioned hereinbefore the pieces of material 5 and 7 shown in FIG. 1A are to be resistance welded or fusion bonded together at a lap joint. When referring to a "lap joint" herein, the term is meant to include the area at which multiple pieces of material overlap, which area is to be welded to permanently join the two pieces together. It should be understood that although for purposes of this disclosure a lap joint is described, the invention in equally applicable to butt welding of pieces end to end. In such a case, the thickness of the parts to be joined should be sufficient for this type of welding. For example, the thickness of each part to be welded may be about ½ inch.

The overall concept of resistance welding includes thermal energy being supplied directly to the bond interface between the portion of film 11 on material 5 which overlaps a portion of film 13 on material 7 which is designated Zone A in FIG. 1A. As noted hereinbefore, for convenience of disclosure FIGS. 1A through 1C show two pieces 5, 7 of material being joined, however, the invention is equally applicable to other joints such as joining three pieces of material in a double lap joint.

Figure 1B:
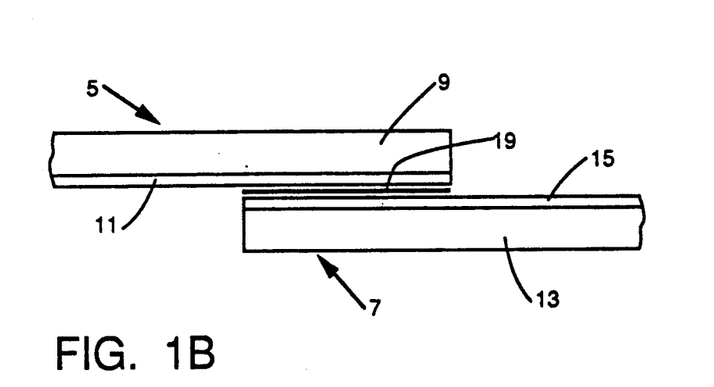
FIG. 1B is a schematic front elevation of the pieces of FIG. 1A after being welded.
Figure 1C:
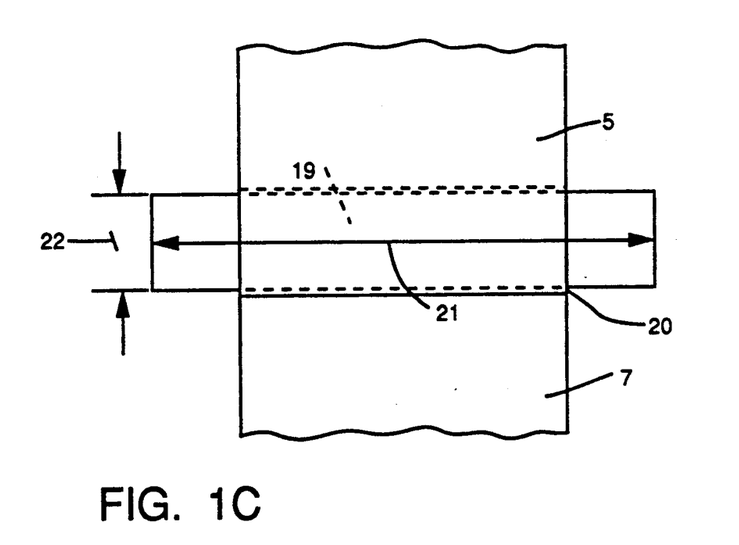
FIG. 1C is a top plan view of the welded pieces of FIG. 1B.

Electric current is passed through a heating element 19 which is placed in the bond interface between piece 5 and piece 7 as shown in FIG. 1A through 1C. First piece of material 5, heating element 19 and second piece of material 7 form a weld stack. At least two pieces 5, 7 of material to be welded and the heating element 19 are sandwiched together prior to the electric current being passed through heating element 19. The heating element 19 is not removed after the welding process but instead remains in the welded material and may be used for joint repair later by energizing the heating element and repeating the cycle.

Preferably, heating element 19 is composed of continuous carbon fibers which are in a matrix. To prepare the heating element, the polymer is ashed off the ends of the matrix to expose the carbon fibers. A conductive metal-filled polymer paste can be applied to the exposed carbon fiber to enhance the electrical connection. The heating element 19 can be made from commercially available "prepreg" material as will be understood by those skilled in the art. This material consists of a thin sheet of carbon fibers embedded in a polymer matrix. It is preferable to have this matrix similar to or identical to the matrix material within the parts being joined, or the same as the resin layer material used with dual-resin bonding process. The carbon fibers can be unidirectional rather than in a mesh configuration.

Referring to FIG. 1C, the length 21 of the heating element 19 as measured axially along the weld joint 20 preferably extends substantially beyond the entire length of the joint 20 being welded. The thickness of the heating element 19 is preferably between about 0.005 and 0.010 inches.

The joint 20 is heated when current is supplied to heating element 19 causing joule or resistance heating. Preferably, the joint 20 is heated above the melt temperature or glass-transition temperature, as the case may be, of films 11 and 15. Substantially simultaneously, a consolidation pressure is applied as discussed hereinafter. When substantially uniform melting of the interface is achieved, current is turned off and the pieces of material 5, 7 now joined are cooled, preferably under a lower pressure, to assure good bonding.

Figure 2:
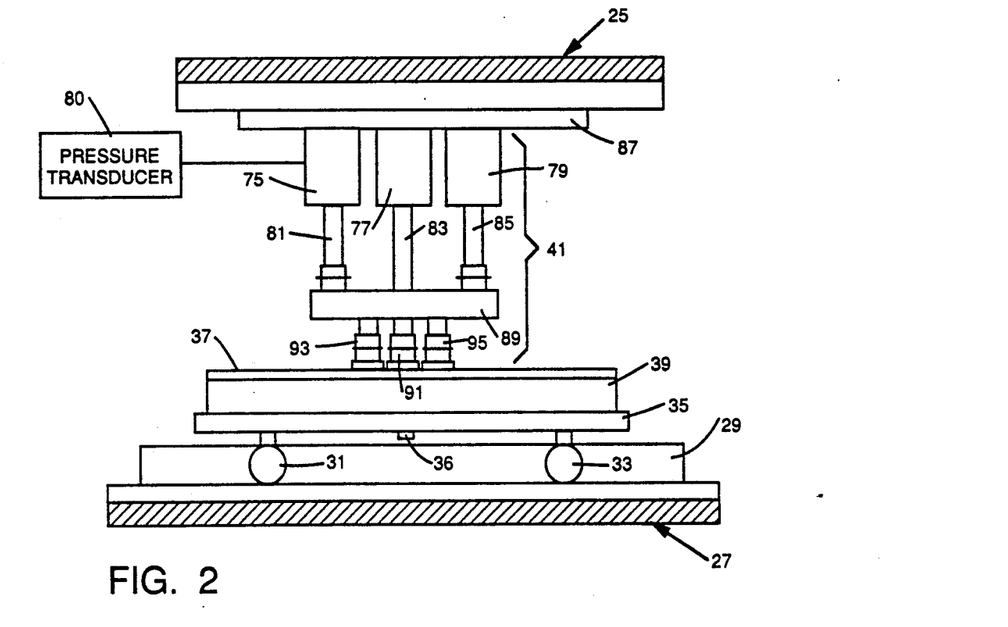
FIG. 2 is a schematic front elevation of a form of apparatus for resistance welding of the present invention.

Turning now to FIG. 2, the apparatus of the present invention will be described in detail. A suitable support structure having upper portion 25 and lower portion 27 is provided. Lower support portion 27 has steel channel 29 in which a set of rollers 31 and 33 are carried. A second set of rollers (not visible in FIG. 2) would also be provided on the opposite side of the carriage 35. The rollers 31, 33 (and the second set of rollers) support a motorized welding carriage 35. The operation of the welding carriage 35 is described in further detail hereinafter.

A weld stack 37 of composite parts including film layers and heating element 19 (FIG. 1A) is placed on the carriage 37. The composite parts (which include the film layer) and heating element 19 forming weld stack 37 may be placed manually into the machine. Alternatively, a conveyor system (not shown) may be used to insert the weld stack 37 into the machine. The weld stack 37 is retained in a stationary position on the carriage during welding due to the low pressure and high pressure clamping. During carriage movement, as described hereinafter, displacement of stack 37 is unlikely since the movement carriage 35 is not rapid enough to jar the stack 37 from its initial placement on carriage 35. The weld stack 37 is placed upon insulating material 39 covering the carriage 35. Insulating material 39 may be a dense silica-based refractory material known as maronite, or any other type of refractory material that can withstand the temperatures used in the welding process and which is not too brittle.

Insulating material 39 functions to electrically and thermally insulate the remainder of the welding apparatus such as carriage 35 from the electrical connections used to supply current to the heating element 19 (not visible in FIG. 2) which is a portion of stack 37. The pressure application assembly of the present invention is generally designated by reference character 41.

The preferred embodiment of the present invention involves step wise welding, which means that the welding process is performed on individual segments of weld joint 20. A weld cycle is sequentially performed on each segment until the entire joint is welded. The joint may be welded continuously along its entire length, or there may be gaps between welded areas if desired in a given application.

In each weld cycle, the pressure is applied on a individual segment of the overlapping portions. Preferably, the individual segment will be about 2 inches long along about a 4-inch-wide (dimension 22 in FIG. 1C) lap joint 20 for example. It is to be understood, however, that with upscaled equipment components, even larger pressure segments and lap joints may be employed if desired.

Figure 3:
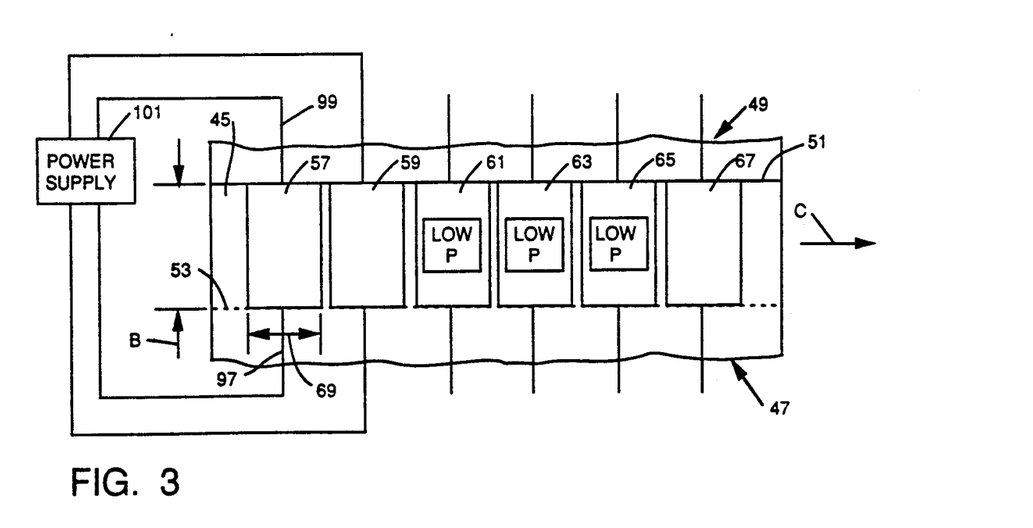
FIG. 3 is a schematic top plan illustration of a heating element and high and low pressure elements along the lap joint width of two pieces of material being joined in accordance with the present invention.

This will be more readily understood with reference to FIG. 3. FIG. 3 shows a lap joint 45 which is composed of the overlapping portion between a leading sheet 47 of the composite material and a trailing sheet 49. Line 51 shows the leading edge end of leading sheet 47. The edge of piece 49 underlying leading sheet 47 is designated by dashed line 53. The lap joint width is designated by dimensional arrow B and is preferably about 4 inches, however it can be a minimum of about 0.25 inches. Instead of providing one long heating element 19 (FIG. 1C), it may be preferred to provide individual sections of heating element material. For example, heating element portions 57 through 67 are placed between material 47 and 49 as shown in FIG. 3. Each heating element portion 57 is preferably about 2 inches in the dimension axial to the elongated weld joint 45 in FIG. 3 which dimension is designated by reference character 69. Each heating element portion 57 is preferably the same size as the lap joint in its dimension perpendicular to the axial direction. Welding is performed in a sequential process in about 2 inch steps along the length of the weld joint 45 in the weld direction designated by arrow C in FIG. 3.

Referring again to FIG. 2, carriage 35 automatically moves laterally along the weld joint 45 to place the portion to be welded at any particular time directly under the pressure assembly 41. This motion is preferably computer controlled.

Referring more particularly to pressure assembly 41 shown in FIG. 2, the pressure assembly is rapidly variable in that it can be controlled to operate anywhere from zero pressure to full pressure. It is preferred to provide cylinders which are capable of providing a continuously variable, high pressure consolidation force on the weld area and supplying a low pressure clamping force to the areas adjacent to the weld step. In order to accomplish this, it is preferred to use three cylinders, which may be pneumatic or hydraulic, such as the cylinders designated 75, 77 and 79 in FIG. 2. It is most preferred to provide pneumatic cylinders. The central pneumatic cylinder 77 provides the high pressure consolidation force on the area being welded at a particular time. Pneumatic cylinders 75 and 79 provide low pressure clamping forces to the areas adjacent to that weld area.

It is preferred to provide a high pressure cylinder which can produce a consolidation pressure of about 100 psi. Preferably, the cylinder internal bore diameter will be between about 4 and 10 inches and is most preferably about 4 inches. The low pressure clamping force is typically only about half the amount of the high pressure force. Thus, the internal bore diameter size for the low pressure cylinders 75, 79 will be between about 2 and 6 inches and will most preferably be about 4 inches. In another embodiment of the invention, all cylinders may be of equal size, such as a 4 inch bore size for example, and the pressure may be controlled as desired in the applications.

These cylinders may be obtained commercially such as the SC series air cylinders marketed by Schrader Bellows of Akron, Ohio. Such cylinders are capable of providing up to 250 psi of pressure. These cylinders are lightweight and having a wide range of operation, which is desirable in the present application.

As shown in FIG. 2, cylinder 75 has a piston rod 81, cylinder 77 has piston rod 83 and cylinder 79 has piston rod 85. Valves for operation of the cylinders are preferably four-way spool valves marketed by Schrader Bellows. Appropriate regulators, lubricators and filters may also be provided to process the incoming air before it reaches the cylinder as would be readily understood by those skilled in the art. In order to provide for variable consolidation pressure on the weld area, a pressure controller 80 is supplied with the system. This is preferably a Bellofram type 1,000 pressure controller obtained commercially from Bellofram. This unit is automatically controlled by the computer which generates a voltage signal that corresponds to the desired pressure level.

The cylinders 75, 77, 79 each have an external diameter of about five inches. However, the weld areas as discussed hereinbefore are preferably only two inches wide and are preferably located directly adjacent to one another (FIG. 3). The piston rods 81, 83, and 85 of cylinder 75, 77, and 79 respectively would not be close enough together to provide concentrated pressure to the weld area. The present invention provides for transferring the pressure from the cylinders to the smaller weld area. More particularly, cylinders 75, 77, and 70 are mounted in-line on an aluminum plate 87 and are suspended above the stack 37. The piston rod center lines are approximately 6½ inches apart. The piston rod 83 of high pressure cylinder 77 extends directly downwardly towards stack 37 and applies its pressure directly to stack 37 by means of high pressure foot 91 along the weld area being welded at that time. However, the low pressure connecting rods 81 and 85 would be too far removed from the areas of interest if they were to directly extend to the stack 37. As a result, a low pressure application frame 89 is provided. The frame 89 is preferably rectangularly shaped with an open center to provide clearance around the center piston rod 83 so that piston rod 83 passes through frame 89 towards stack 37. Two pressure feet 93 and 95 are mounted on the underside of frame 89 adjacent to the lower portion 91 of high pressure rod 83. The low pressure is transferred from piston rods 81 and 85 to frame 89 and through frame 89 to feet 93 and 95 to apply pre- and post-heat pressure and lower pressure during the welding, if desired, as a clamping pressure to the areas adjacent to the weld area. The low pressure frame 89 is provided on a hinge mechanism to allow pivoting of the entire frame 89 in order to gain access to the composite parts for removal or insertion of the parts to be welded. The high pressure foot 91 is not connected to frame 89 because the weld area will be located directly underneath high pressure cylinder 77. Rod 83 moves freely through an opening in frame 89.

Heating element portions 57 through 67 which extend across the weld area are shown in FIG. 3. Preferably, four heating segments will be provided for each of the twelve weld steps and each individual heating element portions such as portion 57 would actually be composed of four separate heating element segments. The invention, of course, is not limited to this configuration as the heating element portion can be of many different sized and shapes.

The heating element portions 57 are preferably composed of unidirectional carbon fibers contained in a polymer matrix. Forty-eight individual heating element segments are to be electrically connected to the main power supply (not shown on FIG. 3). The connections are schematically illustrated by leads 97 and 99 which are electrically connected to heating element portion 57. Similar leads are shown for heating element portion 59 in FIG. 3.

Figure 4:
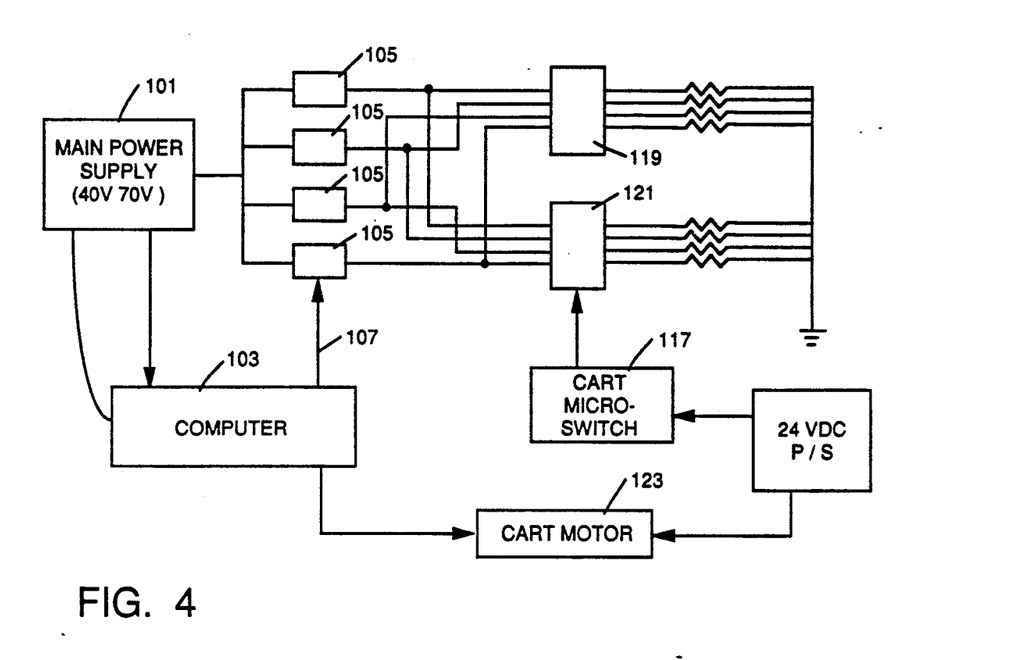
FIG. 4 is a schematic block diagram of a electrical system and the computer control system of the present invention.

All of the segments are electrically connected with clamps to an array of mechanical relays, 119 and 121 as shown in FIG. 4. Mechanical relays 119 and 121 turn on power to the desired segment being welded. In addition, heating element portions making up the next weld section may be activated by an auxiliary pre-heat power supply for preheating. In an application in which there are forth-eight weld segments, there would also be forth-eight mechanical relays.

In order to provide power as necessary for both the pressure application system and the heating elements, a variable power supply is provided. The power supply is shown schematically as block 101 in FIG. 3. Power supply 101 is shown as connected to first element portion 57 and second element portion 59, however, there will be connections to all elements as mentioned hereinbefore which will be switched on and off as desired.

In addition, a high speed switching device is also preferred. This will be described more particularly with reference to FIG. 4. FIG. 4 shows main power supply 101 which is connected between computer 103 and the high speed switches which are preferably solid state relays ("SSRs") which are collectively designated by reference character 105. The SSRs 105 are for switching DC current. They can be driven by the transistor-transistor logic (TTL) signals of computer 103 as shown by lead 107. One SSR can be used per segment. In addition, a number of SSRs may be switched on simultaneously for a given weld step if the cycling is not desired.

Figure 5:
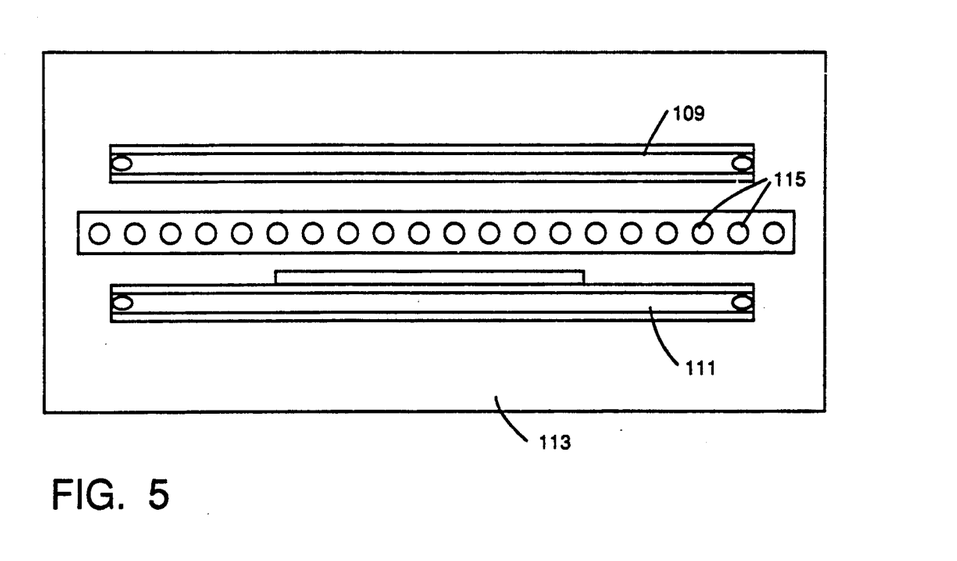
FIG. 5 is a schematic illustration of a welder work area showing the aluminum locking strip.

As noted hereinbefore, it is preferred to provide a moveable carriage 35 (FIG. 2) which will move the pieces of material 5, 7 so that small step-wise portions will be welded at one time. The carriage 35 rides in a set of channels 109, 111 which are shown in FIG. 5. Channels 109 and 111 are tracks which are spaced appropriately and have a depressed portion within which rollers 31, 33 and the second set of rollers of carriage 35 ride. Between the channel tracks 109 and 111, is an aluminum locking strip 113. Aluminum strip 113 has a plurality of substantially equally-spaced holes 115.

Carriage 35 is also provided with solenoid switch 36 (FIG. 2). Solenoid switch 36 interacts with holes 115 as the carriage moves along the channel tracks 109 and 111. The microswitch 36 is connected to the computer and control system such that as the carriage 35 moves along channel tracks 109 and 111, the computer will be informed of the location of the carriage 35 so that the appropriate heating element along the welding area will be activated. While the preferred form of the invention involves a carriage 35 which moves with respect to the weld stack 37, if desired, the cylinders may be moved with respect to the weld stack 37 with suitable adaption to the system.

Referring again to FIG. 4, the microswitch 36 is schematically designated as 117. The switch 117 interacts with mechanical relays 119 and 121. The solenoid switch 36 is mounted on the bottom of the welding carriage 35. The aluminum locking strip 113 is mounted to the table 30 on which the channel tracks 109 and 111 are mounted. As the carriage 35 moves along the channel tracks 109, 111, microswitch 36 moves in and out of holes 115 on the locking strip 113.

The microswitch 36 turns current on and off to cart motor 123 (FIG. 4). The microswitch 36 is tripped by the raising and lowering of an internal solenoid pin (not shown). When the pin is in one of the holes 115 of locking strip 113, the microswitch 36 is open and the carriage will be stationary. When the switch 36 is activated (or closed), the pin lifts out of hole 115 and motor 123 is switched on providing motion to the carriage 35. When the pin reaches the next hole it drops in and opens the microswitch 36, stopping the motor 123 and stopping the carriage 35. This also signals to the computer 103 that welding may begin for the next step. Commands are then communicated by computer 103 to signal the appropriate switch 119, 121 (FIG. 4) to activate the pressure system 41 and the appropriate heating element 57.

Figure 6:
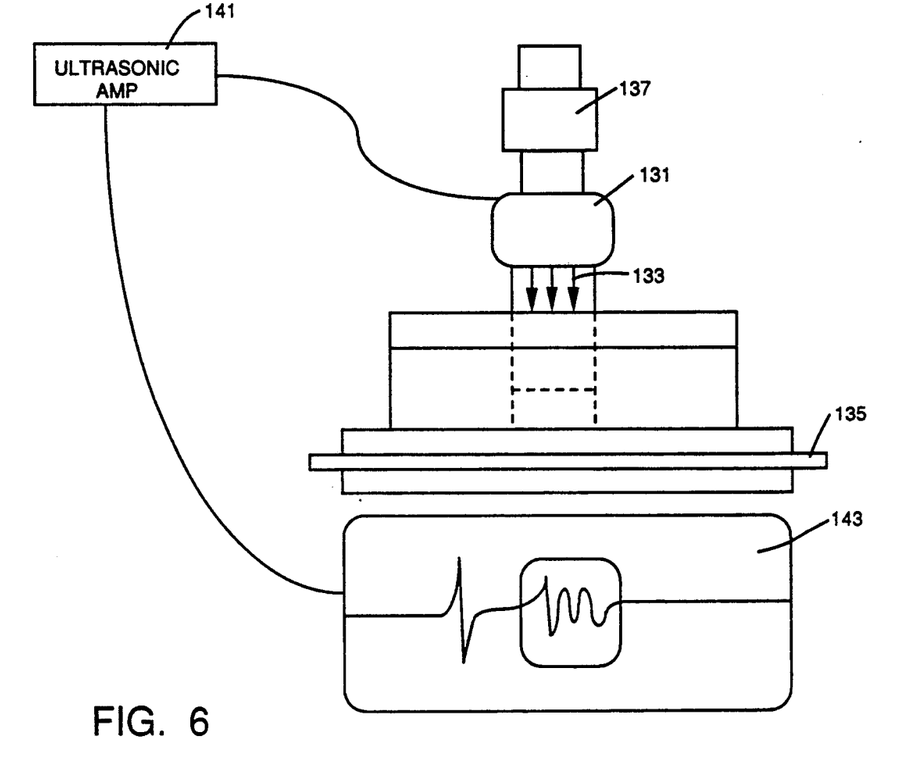
FIG. 6 is a schematic illustration of an ultrasonic detection subassembly of the present invention.

In creating a weld in accordance with the present invention, it is important that the melting temperature of the film 11, 15 (FIG. 1) be reached. However, it is undesirable to have melting occur in the underlying substrate such as 9, 13. As a result, a melt detection assembly is provided as shown in FIG. 6. This is preferably an ultrasonic inspection apparatus which detects the point at which melting occurs. Ultrasonic transducer 131 provides ultrasonic energy in the form of ultrasonic waves designated generally by reference character 133. This ultrasonic energy is directed towards weld stack 135. Preferably, transducer 131 is located or adjacent to high pressure foot 91. The transducer 131 is activated by solenoid 137 which is in communication with the central computer 103 (FIG. 4). The solenoid 137 lowers the ultrasonic transducer 131 and presses it against the weld stack 135 to initiate ultrasonic energy 133 to being impinged upon weld stack 135. The ultrasonic energy 133 is returned to the transducer 131 as an echo. The transducer 131 is connected to an ultrasonic amplifier 141, which amplifies the signal and converts it to an electrical signal. A suitable oscilloscope 143 is provided which generates a visual indication of a waveform generated by the ultrasonic transducer 131 when it receives the echo from the weld stack 135. When a melt occurs, the polymeric flow causes a sudden change in acoustic coupling, thus causing a drop below a predetermined threshold value in the waveform shown in oscilloscope 143. The computer 103 monitors the amplitude of the waveform from the ultrasonic inspection device 131. After a dwell time of between about 5 to 150 sec the computer 103 can initiate a signal for the carriage 35 to move to the next weld segment as appropriate.

Figure 7:
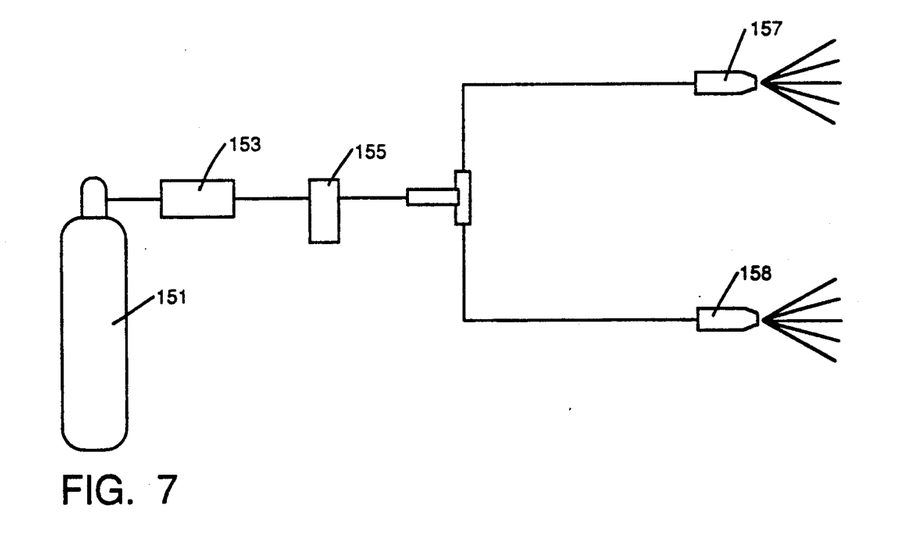
FIG. 7 is a schematic illustration of the cooling subassembly of the present invention.

It is also preferred to provide a cooling system for cooling the joint during welding. Excessive heating or overheating at the site of the lap joint could occur in certain instances. The cooling system of FIG. 7 may be employed. A cooling fluid such as nitrogen is supplied to the heating element 19 as it enters the substrate 5. (FIG. 1C). Preferably, nitrogen tank 151 supplies inert cooling gas. A regulator 153 and three-way solenoid valve 155 are provided. Preferably, the solenoid valve 155 is a Schrader Bellows valve. The nitrogen supply is triggered on command by the computer 103. The valve preferably is capable of operating up to about 250 psi. Nitrogen is passed through the valve and through spray nozzles 157 and 158, which are preferably mounted such that the nitrogen is supplied to the weld area, near the heating element. This occurs during the welding process to inhibit overheating of the exposed portion of the heating element 19.

Computer 103 is suitably programmed as would be readily understood by those skilled in the art to perform the control steps for the smooth working of the process of the present invention.

Figure 8:
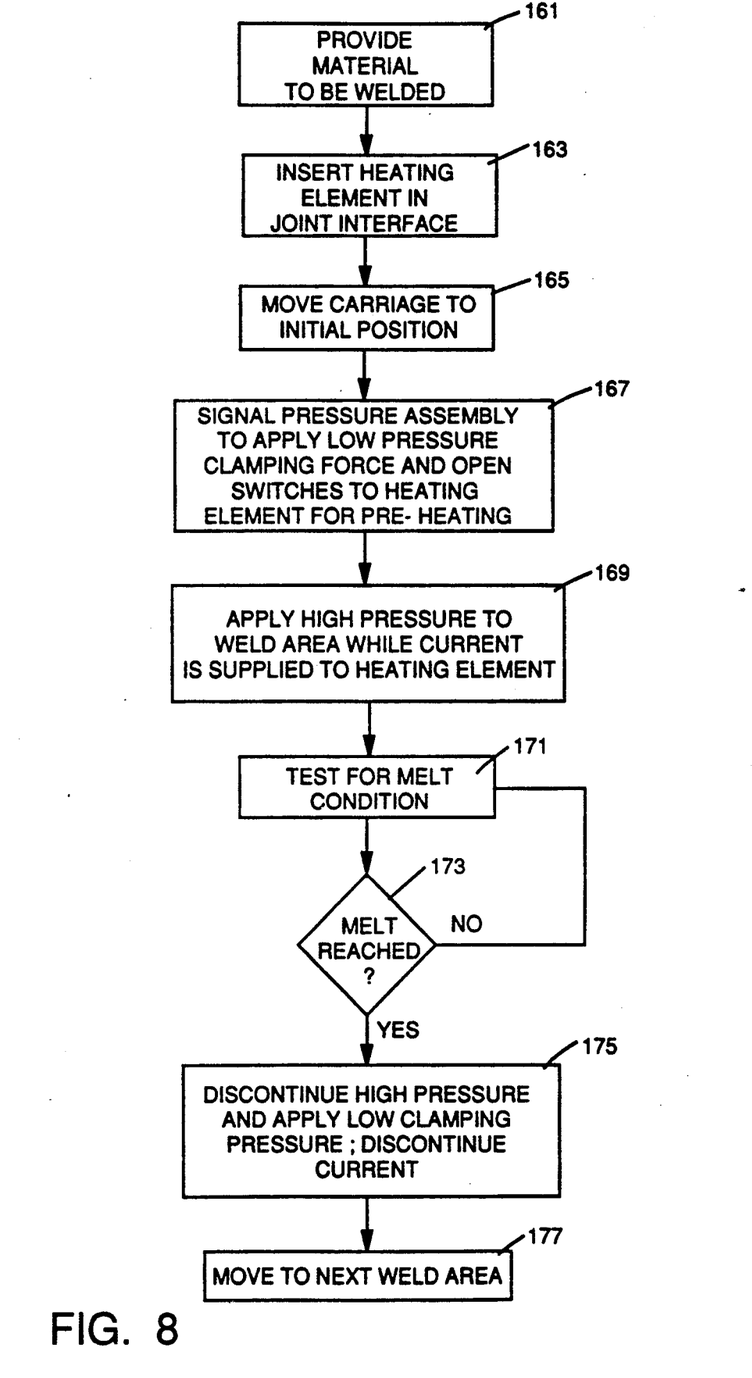
FIG. 8 is a flow chart of the method of the present invention.

In accordance with the method of the present invention and with reference to the flow chart of FIG. 8, the method includes providing two pieces of material 5, 7 which may be thermoplastic material to be welded. A neat resin film layer is also added independently or consolidated onto the substrate as a film or a coating. Alternatively, the neat resin film layer is coated onto both sides of the heating element 19. Heating elements 57 through 67 are sandwiched between the joint 20 of the two materials 5, 7 to be welded as shown in step 163. Once the material 5, 7 with the heating elements 57 in place is appropriately positioned in the welding device, the carriage 35 is moved to its initial position as shown in step 165. The microswitch 36 on the carriage 35 will have its pin dropped into a hole 115 in the aluminum strip 113 causing the cart motor 123 to stop. Once the carriage 35 is in its appropriate position, this signals the microcomputer 103 to begin the welding process as follows. Preferably a two-inch wide weld area is placed under high pressure weld foot 91. Of course, the weld area may be of some other suitable dimension. The pressure applied is between about 25 and 200 psi, as shown in step 167. At the same time, the area adjacent the weld is subjected to low pressure by low pressure feet 93 and 95. This low pressure is preferably between about 10 and 100 psi. Simultaneously, the appropriate heating element 57 is supplied with current of about 36 and 144 kilowatts per meter squared as shown in step 169 to generate heat to a temperature of between about 600° and 800° F. This occurs for between about 5 and 200 seconds. The test for the melt condition is then performed as shown in step 171 and 173. The computer 103 monitors the amplitude of the ultrasonic signal from the ultrasound inspection device. The computer 103 will initiate appropriate action. After the weld of that area is complete, the pressure and heat are discontinued as shown in step 175. The microcomputer 103 signals the pin to retract in the motorized welding carriage 35 and the carriage 35 moves to its next position as shown in step 177. The welding continues in the manner hereinbefore described with the next weld area. This process continues until the entire joint is welded.

EXAMPLE

Two composite pieces 5, 7 of material composed of PEEK/graphite laminates were obtained (FIG. 1A). The pieces 5, 7 measured about four inches by eight inches. Heating elements 57 composed of unidirectional fibers of graphite were placed between pieces 5 and 7 in the joint 20 to be welded. The stack 37 composed of heating elements 57 sandwiched between the pieces 5 and 7 was positioned appropriately. A lower pressure was applied and maintained during the welding process by low pressure feet 93 and 95 of between about 10 and 50 psi. (FIG. 2). High pressure was applied in the amount of 50 to 150 psi by high pressure foot 91. Simultaneously, current was applied to heat the heating element 57 to a temperature of at least about 600° to 800° F. This produced melting of the film portion of each part of material 5 and 7 as confirmed through ultrasonic testing. The pressure and current were applied for between about 60 to 200 seconds, to allow the film on first piece to material 5 to fuse with the film on the second piece of material 7. Nitrogen coolant was blown onto the ends of the stack 37 during welding to minimize overheating of the exposed portions of heating element 19. The coupling process was continued following welding for about 60 seconds to increase cooling of the weld before pressure was released and the stack was moved to the next weld step.

It should be understood that the invention can also be equally applied with respect to butt welding and with respect to other materials. It is preferred that a layer of dissimilar material with a melting temperature or glass transition temperature which is less than that of the underlying composite material be provided in the weld stack.

It will be understood that the invention provides a simple and rapid means of welding two pieces of thermoplastic material, particularly fiber reinforced composites, in a highly efficient and effective manner.

Whereas particular embodiments of the invention have been described for purposes of illustration, it will be appreciated by those skilled in the art that numerous variations of the details may be made without departing from the invention as described in the appended claims.

What is claimed is:

1. Resistance welding apparatus for welding at least two pieces of material comprising
   support structure means for receiving and retaining said pieces of material, electrical resistance heating element means for positioning between said pieces of material and generating resistant heat in a weld area between said pieces of material forming a weld stack, pressure application means for applying first pressure to said weld area, control system means operatively associated with said heating element means and said pressure application means and carriage means for establishing relative movement between said weld stack and said support structure in sequential steps such that a weld cycle is performed on a plurality of said weld areas.

2. The welding apparatus of claim 1 further comprising inspection means for inspecting said weld area of said weld stack during a weld cycle to detect melting in said material.

3. The welding apparatus of claim 2, wherein said control system means includes means for signaling said pressure application means to reduce pressure when said inspection means indicates that at least one of said pieces of material has reached a melt condition and said control system also signaling said heating element means to reduce heat under predetermined conditions.

4. The welding apparatus of claim 1 wherein said weld stack also includes layer members positioned above and below said heating element means, said layer members being composed of a substance having at least one of a melting temperature and a glass transition temperature at least as low as that of said pieces of material, and said inspection means indicates that at least one of said layer members has reached a melt condition.

5. The welding apparatus of claim 1 also comprising cooling means having a coolant fluid supply and nozzle means through which said fluid supply is discharged toward edges of said weld area.

6. The welding apparatus of claim 5 wherein said fluid supply is nitrogen gas.

7. The welding apparatus of claim 1, wherein said pressure application means comprises a plurality of cylinders with at least one first cylinder being a high pressure cylinder, said high pressure cylinder having a foot member which directly engages said weld stack to apply pressure to said weld area.

8. The welding apparatus of claim 7, wherein said pressure application means includes second cylinder means for applying a second pressure lower than said first pressure to predetermined portions of said weld stack adjacent said weld area.

9. The welding apparatus of claim 8, wherein said pressure application means includes two said second low pressure cylinders for applying said second pressure to said weld stack on both sides of said weld area.

10. The welding apparatus of claim 7, wherein said pressure application means includes pneumatic cylinders.

11. The welding apparatus of claim 8 wherein said pressure application means includes one high pressure cylinder and two low pressure cylinders mounted adjacent to and on opposite sides of said high pressure cylinder, each high and low pressure cylinder having a piston rod, and said high pressure cylinder having a pressure foot at an end of said rod.

12. The welding apparatus of claim 11, further comprising a low pressure frame having pressure feet means which engage said weld stack, said pressure feet means being placed substantially adjacent each side of said foot of said high pressure cylinder, said frame being mounted with respect to said low pressure cylinders such that said piston rods of said low pressure cylinders are secured to said frame to transfer pressure through said frame to said low pressure feet means.

13. The welding apparatus of claim 12, wherein said heating element means has switching means for supplying current only to a predetermined portion of said heating element means within said weld area.

14. The welding apparatus of claim 2, wherein said inspection means includes ultrasonic transducer means for generating ultrasonic energy and for impinging said energy upon said weld area, and receiving reflected ultrasonic energy returned from said weld area and generating a responsive electrical signal corresponding to said reflected energy and indicative of a predetermined melt condition of said weld area.

15. The welding apparatus of claim 14, wherein said ultrasonic transducer means has means for generating signals representative of whether the desired melting of said material has occurred.

16. The welding apparatus of claim 1, wherein said control system means includes a computer.

17. The welding apparatus of claim 1, wherein said carriage means is mounted upon table means, said carriage means being movable along tracks fixedly mounted on said table means so that said carriage means moves said weld stack laterally along said track to sequentially place separate portions of said weld stack adjacent said high pressure cylinder, such that successive portions of said weld stack will be engaged by said foot member of said high pressure cylinder to ultimately weld said weld stack at a plurality of predetermined weld areas.

18. The welding apparatus of claim 17, wherein said carriage means includes an insulating material layer placed between said weld stack and said table means.

19. Resistance welding apparatus for joining at least two pieces of thermoplastic material, each said piece of material having adjacent thereto a layer of a dissimilar material composed of a polymer having at least one of a melting point or glass transition temperature at least as low as that of said piece of material, with at least a portion of one piece of said thermoplastic material overlapping a portion of the other of said pieces of material, the welding apparatus comprising support structure means having movable carriage means for retaining said pieces of material and said layers and for sequentially moving said pieces of material and said layers through said apparatus, electrical resistance heating element means for positioning between said pieces of material and generating heat in a weld area positioned in an interfere between two adjacent surfaces of said layers, said pieces of material having said layers and said heating element therebetween forming a weld stack thereby, said heating element means being connected to current supply means for passing current through said heating element means to generate resistance heating and initiate melting of said layers, a plurality of pressure application cylinders, at least one of said cylinders being a high pressure cylinder having a piston rod to which a pressure foot is connected, said pressure foot engaging a segment of said weld stack for applying pressure thereto to join said pieces of material together, and at least one low pressure cylinder having means for applying low pressure to said weld stack to an area adjacent to said segment engaged by said high pressure foot, and computer control means operatively connected to said heating element means, said pressure cylinders, and said carriage means for controlling said apparatus to sequentially perform a weld cycle on successive segments of said weld stack.

20. The welding apparatus of claim 19 further comprising ultrasonic inspection means for determining melting of said layers.

21. The apparatus of claim 19 wherein said support structure means includes table means and said carriage means includes computer responsive solenoid microswitch means having pin means interacting with said table means such that said pin when interacting with said table means opens said switch and arrests motion of said carriage and said switch when closed in response to a signal from said computer, moves said carriage.

22. The apparatus of claim 19 wherein said cylinders include pneumatic cylinders.

23. The apparatus of claim 20 wherein said ultrasonic inspection means includes ultrasonic transducer means for generating ultrasonic energy and for impinging said energy upon said weld stack, said inspection means having receiving means for receiving reflected ultrasonic energy returned from said weld area and generating a signal from said reflected energy, said signal being indicative of a predetermined melt condition of said weld stack.

24. The apparatus of claim 23 wherein said ultrasonic inspection means generates a signal indicative of whether desired melting of said layer has commenced.

* * * * *